March 18, 1947.   C. L. MOORMAN ET AL   2,417,561
POWER TAKE-OFF DEVICE FOR RAILWAY CARS
Filed July 20, 1945   2 Sheets-Sheet 1

Inventors:
Charles L. Moorman
and Robert M. Burnett,
By Davern, Onus and Borth,
Attorneys.

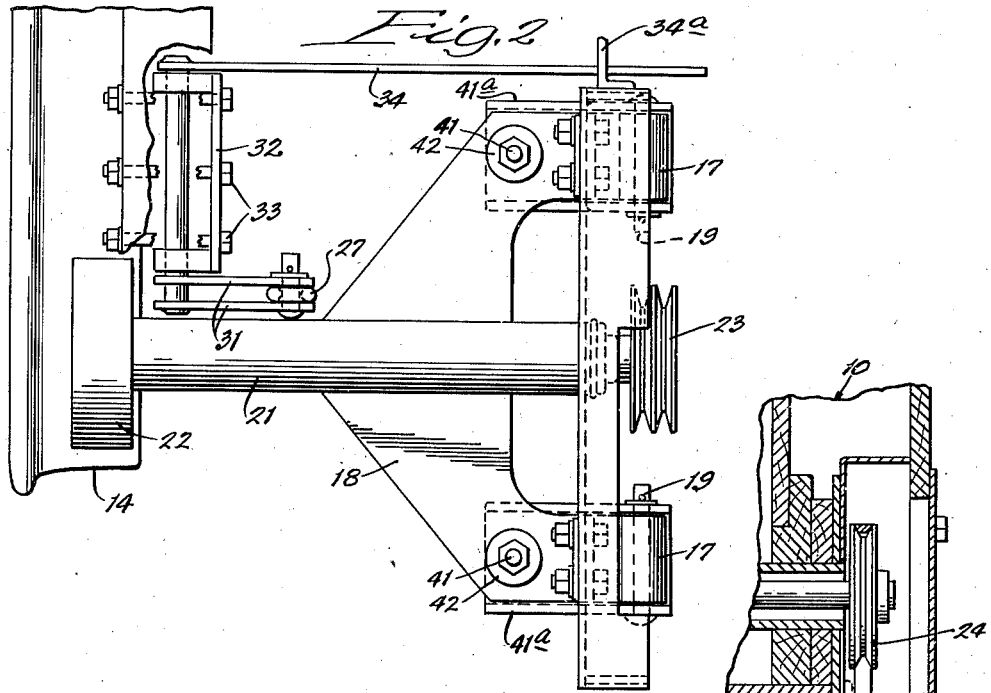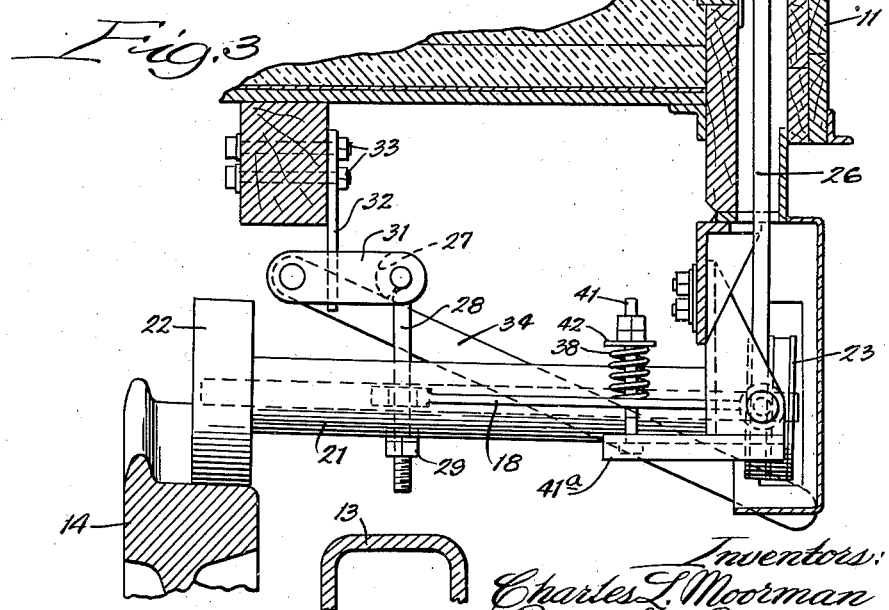

Patented Mar. 18, 1947

2,417,561

UNITED STATES PATENT OFFICE 2,417,561

POWER TAKE-OFF DEVICE FOR RAILWAY CARS

Charles L. Moorman, Millington, and Robert M. Burnett, Chicago, Ill., assignors to Union Asbestos & Rubber Co., Chicago, Ill.

Application July 20, 1945, Serial No. 606,147

7 Claims. (Cl. 74—13)

The invention relates to a take-off device and more particularly to a power take-off for use with railroad cars and the like.

It is an object of the invention to provide a take-off device in which the take-off roller is held in a position engageable with a car wheel.

It is also an object of the invention to provide, in combination with a take-off roller, means for disengaging the take-off roller from the car wheel.

Another object is to provide a take-off device in which the take-off roller can be disengaged from the car wheel for driving by an auxiliary driving mechanism.

It is a further object of the invention to provide a take-off roller that is pivotally mounted so as to align the take-off pulley and the pivotal connection.

Further objects and advantages will be apparent from the following description and the drawings appended thereto.

In the drawings, in which like reference characters refer to like parts:

Fig. 2 is a fragmentary plan view in section of the embodiment illustrated in Fig. 1; and Fig. 3 is a fragmentary front elevational view in section of the embodiment illustrated in Figs. 1 and 2.

Figure 1:
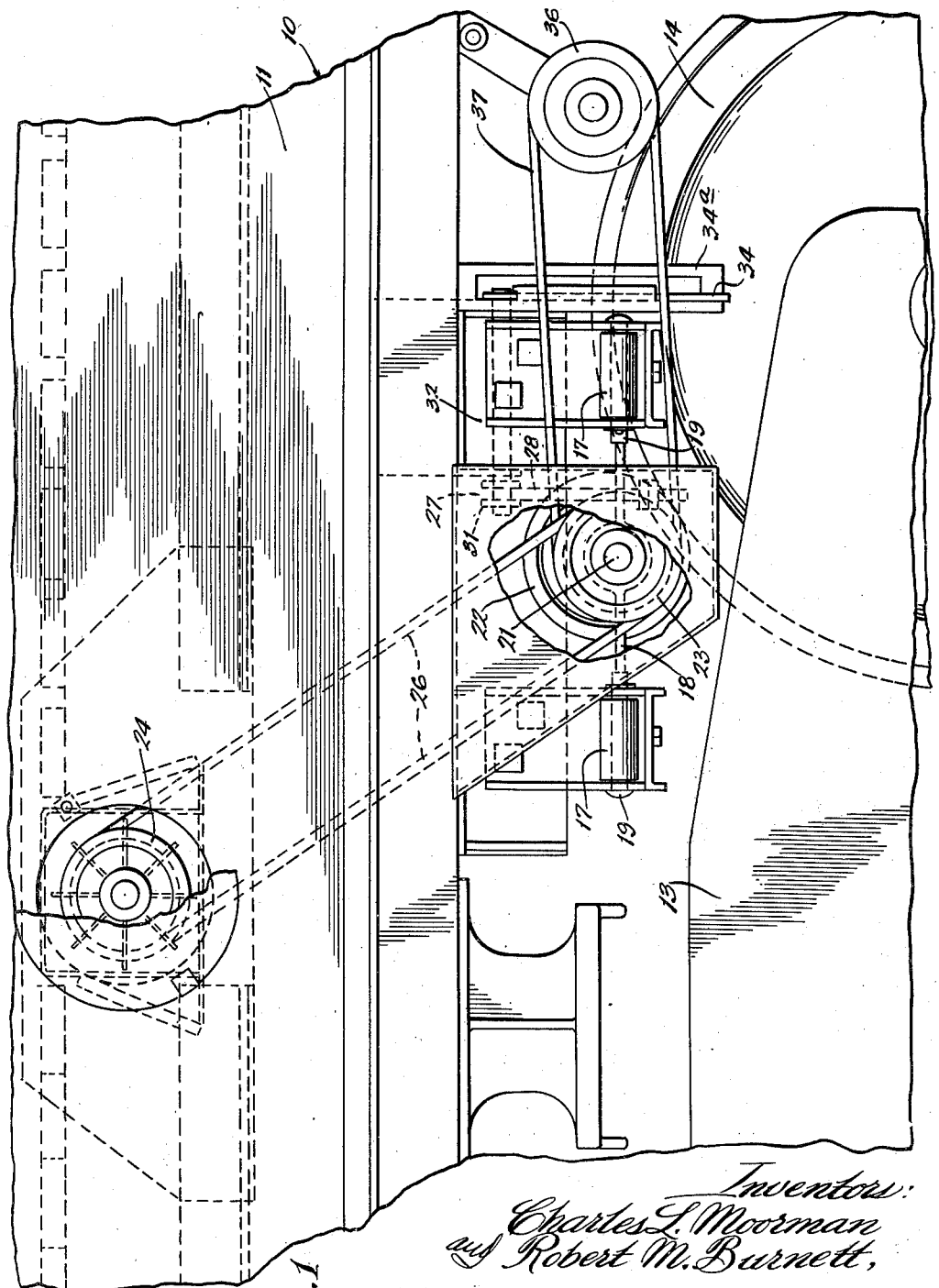
Fig. 1 is a fragmentary side elevational view with a portion cut away of one embodiment of the invention.

In the preferred embodiment of the invention as illustrated in the drawings, the railway car construction 10 comprises car body 11 and car truck 13 having car wheel 14. The take-off device is mounted on the underside of the car body 11 by spaced hinge brackets 17 secured to the underside of the car body by bolts or the like 16. A yoke 18 is pivoted at the ends of its legs to the brackets 17 by hinge pintles 19. The yoke supports a tubular bearing 21 which extends between the legs of the yoke as seen in Fig. 2. A shaft extends through the bearing and carries a take-off roller 22 at one end and a pair of take-off pulleys 23 at its other end.

The take-off roller is a wheel having a substantial edge width and is covered with a material having good frictional characteristics such as rubber or the like. The take-off roller 22 is adapted to engage car wheel 14. Take-off pulleys 23 are driven by the take-off roller and in turn drive auxiliary mechanism 24 in the car through a drive belt 26 which engages the inner one of the take-off pulleys. Take-off pulleys 23 extend from the end of bearing 21 for a sufficient distance substantially to align the center plane of the inner pulley with the pivotal axis of the yoke. By this construction, the inner take-off pulley 23 is not moved any substantial distance when the yoke pivots on the hinges, thereby maintaining correct tension on the belt 26 in all positions of the mechanism.

To maintain contact of the take-off roller 22 with the rim of car wheel 14 during lateral movement of the wheel, suspension means 27 is provided over the take-off bearing 21 and adjacent the take-off roller. The suspension means 27 may comprise pin 28 extending loosely through an ear on the bearing and carrying adjustable stop nuts 29. The pin 28 is supported by an arm 31 pivoted on a plate 32 which, in turn, is secured to the car body by fastening means 33. Pin 28 may be raised and lowered by means of lever 34 which is connected to arm 31. Disengagement of the take-off roller from the car wheel may be effected by raising lever 34 so as to elevate the take-off bearing 21, the lever being latched in its elevated position by an ear 34a on one of the hinge brackets. With lever 34 locked in its upper position, take-off roller 22 is out of contact with the wheel. Such disengagement may be effected for the purpose of driving the auxiliary mechanism 24 by means of auxiliary pulley 36 which is mounted on the car body by fastening means 37. The pulley 36, which may be driven by an auxiliary motor, not shown, is connected to the outer one of the take-off pulleys 23 by drive belt 37. When take-off roller 22 is disengaged by means of lever 34, the take-off roller freely rotates out of engagement with the wheel as the take-off pulleys 23 are rotated by pulley 36.

Elevation of the take-off bearing 21 by lever 34 is resisted by the action of spring 38 which bears against the take-off bearing and against a washer 42 carried by a pin 41 which is secured to a bracket 41a on the hinge support 17. With lever 34 in its lower position, the engagement of the take-off roller with the car wheel 14 is maintained by the action of the spring 38.

In the operation of the take-off device with lever 34 in its lower position and with pulley 36 running idly, the take-off roller 22 is in contact with and driven by the car wheel 14. Lateral movement of the car wheel away from the take-off pulley causes the take-off pulley to be supported by pin 28 in a position only slightly below the rim of the car wheel. When the car wheel returns to its normal position, the take-off roller will ride back up on the wheel to return to its driving position on the car wheel rim. The contact of the take-off roller with the car wheel is insured during vertical displacement of the car body relative to the wheel by means of spring 38.

Where it is desired to operate the auxiliary mechanism by means of pulley 36, lever 34 is locked in its upper position, thereby disengaging the take-off roller from the car wheel.

Elevation of the take-off bearing by means of lever 34 or by vertical movement of the car wheel does not substantially affect the tension on the belt 26 because of the alignment of pulley 23 with hinges 17.

The above detailed description is given for purposes of illustration and the invention is to be limited only by the scope of the appended claims.

We claim:

1. A take-off device which comprises a yoke pivotally secured to the car body, a shaft rotatably carried by the yoke, a take-off roller carried by the shaft and adapted to engage a car wheel, and a take-off pulley carried by the shaft and drivably connected to an auxiliary mechanism, said take-off pulley being in alignment with the pivotal connection of the yoke to the car body.

2. A take-off device which comprises a yoke having its legs pivotally connected to a car body on spaced aligned pivots, a shaft rotatably carried by the yoke at a right angle to the axis of the pivots, a take-off roller carried by the shaft and adapted to engage a car wheel, a plurality of take-off pulleys connected to the shaft and lying between the legs of the yoke, an auxiliary mechanism drivably connected to one of said take-off pulleys, an auxiliary pulley drivably connected to another of the take-off pulleys, and manual means to rock the yoke about its pivots to move the take-off roller out of engagement with the car wheel.

3. A take-off device for use with railway cars and the like comprising a yoke member, means pivotally connecting the legs of the yoke member on spaced aligned pivots to a car body, a shaft rotatably carried by the yoke member, a drive roller carried by the shaft adapted to engage a car wheel, a pulley on the shaft lying between and substantially in alignment with the pivots, and a belt engaging the pulley drivably to connect it to a mechanism on the car to be driven.

4. A take-off device for use with railway cars and the like comprising a yoke member, means pivotally connecting the legs of the yoke member on spaced aligned pivots to a car body, a shaft rotatably carried by the yoke member, a drive roller carried by the shaft adapted to engage a car wheel, means yieldingly urging the yoke member in a direction to press the drive roller into engagement with the wheel, a pair of pulleys on the shaft one of which lies between and substantially in alignment with the pivots, a belt over said one of the pulleys to connect it to a mechanism on the car, auxiliary drive means connected to the other of the pulleys, and manual means to tilt the yoke member in a direction to disengage the drive roller from the wheel.

5. A take-off device for use with railway cars and the like comprising a yoke member, means pivotally connecting the legs of the yoke member on spaced aligned pivots to a car body, a shaft rotatably carried by the yoke member, a drive roller carried by the shaft adapted to engage a car wheel, means yieldingly urging the yoke member in a direction to press the drive roller into engagement with the wheel, a pair of pulleys on the shaft one of which lies between and substantially in alignment with the pivots, a belt over said one of the pulleys to connect it to a mechanism on the car, auxiliary drive means connected to the other of the pulleys, an arm pivoted on the car, a link carried by the arm engaging the yoke to limit movement thereof in response to the yielding means, and a lever connected to the arm to move it in a direction to move the roller out of engagement with the wheel.

6. A take-off device for use with railway cars and the like comprising a support, means at one end of the support for pivotally mounting it on a car, a shaft rotatably carried by the support offset from the pivotal mounting means and intersecting the pivotal axis of the support at substantially a right angle, a pulley carried by the shaft closely adjacent the intersection of the shaft and the pivotal axis of the support, and a driving roller carried by the shaft at a point spaced from the pulley to engage a wheel on the car.

7. A take-off device for use with railway cars and the like comprising a support, means at one end of the support for pivotally mounting it on a car, a shaft rotatably carried by the support offset from the pivotal mounting means and intersecting the pivotal axis of the support at substantially a right angle, a pulley carried by the shaft closely adjacent the intersection of the shaft and the pivotal axis of the support, a driving roller carried by the shaft at a point spaced from the pulley to engage a wheel on the car and manual means to move the support in a direction about its pivotal axis to disengage the roller from the wheel.

CHARLES L. MOORMAN.
ROBERT M. BURNETT.

REFERENCES CITED

The following references are of record in the file of this patent:

UNITED STATES PATENTS

| Number | Name | Date |
|---|---|---|
| 1,280,459 | Hecker | Oct. 1, 1918 |
| 2,260,633 | Moorman | Oct. 28, 1941 |